Nov. 14, 1961    A. R. HERMAN    3,008,204
PRECISION CASTING METHOD AND APPARATUS
Filed Oct. 29, 1958    2 Sheets-Sheet 1
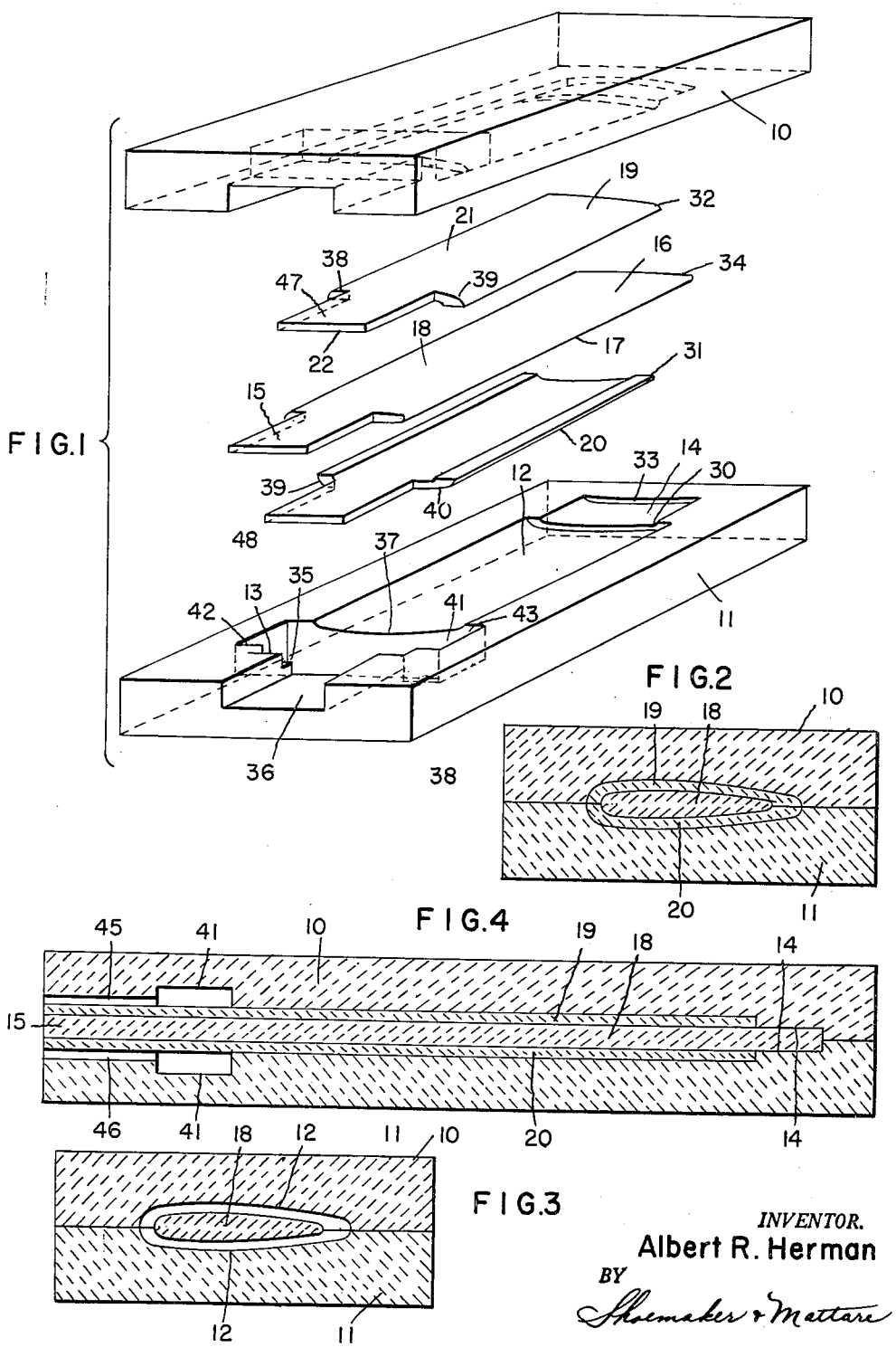
INVENTOR.
Albert R. Herman
BY
Shoemaker & Mattare
ATTYS Nov. 14, 1961 A. R. HERMAN 3,008,204
PRECISION CASTING METHOD AND APPARATUS
Filed Oct. 29, 1958 2 Sheets-Sheet 2

INVENTOR.
Albert R. Herman
BY
Shoemaker & Mattare
ATTYS

United States Patent Office 3,008,204
Patented Nov. 14, 1961

3,008,204
PRECISION CASTING METHOD
AND APPARATUS
Albert R. Herman, Elverson, Pa., assignor to The Beryllium Corporation, Reading, Pa., a corporation of Delaware
Filed Oct. 29, 1958, Ser. No. 770,494
8 Claims. (Cl. 22—165)

This invention relates in general to a method and apparatus for precision casting and pertains more particularly to the production of relatively thin and small castings as, for example, turbine blades and the like.

In the production of small, thin castings, considerable difficulty is experienced due to distortion, necessitating in many instances intricate machining operations to achieve the desired shape, and/or configuration. Moreover, in conventional techniques for producing such products, the "lost wax" or investment process is used, which, as is well known in the art, entails the expenditure of a considerable amount of time in the preparation of the molds for casting. It is therefore of primary concern in connection with this invention to provide a novel process and apparatus particularly adapted for the production of thin castings wherein the component parts of the mold and core are easily and readily made and require a minimum of time for producing the mold for casting and wherein warpage of the product is controlled in such a manner as to confine all warpage to a symmetrical type such that any distortion can be corrected by relatively simple machining operations.

Another object of this invention resides in the method of casting wherein the mold and core as well as certain cavity filling parts are constructed of disposable ceramic materials and wherein these parts are assembled together as a unit and as a compact mass for curing under heat, with the assembled relation minimizing any distortion of the component parts and to confine that slight distortion which may occur to be symmetrical so as to be easily corrected by relatively simple machining opreations.

A further object of this invention concerns the method of precision casting of thin parts wherein a pair of separable mold parts are utilized, defining a mold cavity therein and wherein this mold cavity is substantially completely filled by a core and by core setters or patterns co-operable therewith, but separable from the mold parts and from each other, all such parts being constructed of ceramic material and being fired or cured simultaneously and as an assembled unit whereby to minimize distortion of the individual parts thereof and assuring uniformity therebetween, the core setters being disposable and, when disposed of, the individual parts remaining being re-assembled, forming the ultimate mold cavity into which the molten metal is introduced.

A further object of this invention is to provide an improved molding assembly consisting of a pair of mold members presenting a cavity therebetween, a core within the mold cavity and surrounded by patterns or core setters, filling that portion of the mold cavity into which molten metal will be introduced and with such patterns, core and mold pieces all being formed of ceramic material and presenting, when assembled for curing, a substantially compact and homogeneous mass such that the patterns will hold the core properly in position with respect to the mold pieces during the curing or firing process and the ceramic material, the core setters or patterns being ultimately disposable before utilizing the assemblage for casting purposes.

Still another object of this invention is to provide an improved molding assembly wherein a mold cavity, formed between a pair of separable ceramic members, is substantially completely filled with pattern and core pieces and wherein this assemblage is fired or cured as an assembled unit to minimize distortion of the individual parts and to confine such distortion if it occurs to a symmetrical type of distortion which can be corrected relatively easily as compared to asymmetrical distortion which might otherwise occur.

Another object of this invention in addition to those specifically enumerated above is to provide an improved casting assembly utilizing relatively inert ceramic materials thereby eliminating the inclusion of contaminants in the cast material and wherein additionally the ceramic material permits of such casting with a minimum of distortion and with an economy heretofore unobtainable in the prior art.

Essentially then, the basic object of this invention is directed to improvements in precision casting techniques in such a manner that the articles cast, particularly thin wall castings, can be made not only more economically but with much greater rapidity, thus satisfying the demands of the industry for such objects as turbine blades, particularly, and the like, and wherein such improved technique encompasses the use of an integrated mold assembly wherein the component parts thereof are so fashioned and cured as to be entirely compatible each with the others whereby distortion of the component parts is minimized and wherein consequently the distortion of the finished product, if it does occur, is also minimized and, further, wherein any distortion which does occur will be of such nature as to be easily cured with rather simple machining operations and without requiring any complex machine set-ups for correcting distortion.

These objects are accomplished essentially by virtue of the fact that the mold assembly is formed and assembled in an uncured state, being formed preferably of ceramic material, and held in such assembled position with the substantial absence of any voids, pockets or the like within the mold assembly itself and wherein the mold assembly is cured in such state so that the compact mass of the mold assembly tends to maintain the individual component parts thereof in proper shape, form and position relative to each other and to thereby minimize any distortion of the individual parts themselves.

In the drawings:

FIG. 1 is an exploded perspective view showing the component parts of the mold assembly with relation to each other;

FIG. 2 is a transverse sectional view taken through the mold assembly prior to casting and during the curing process and illustrating the manner in which the various elements thereof cooperate to minimize distortion and to confine any that does occur to a symmetrical type which can be corrected relatively easily;

FIG. 3 is a view similar to FIG. 2, but illustrating the core setter or pattern parts removed from the mold assembly and with the mold assembly being assembled prior to the casting operation;

FIG. 4 is a longitudinal section taken through the assembly as shown in FIG. 3 and illustrating the manner in which the core piece is supported by the mold member;

Figure 5:
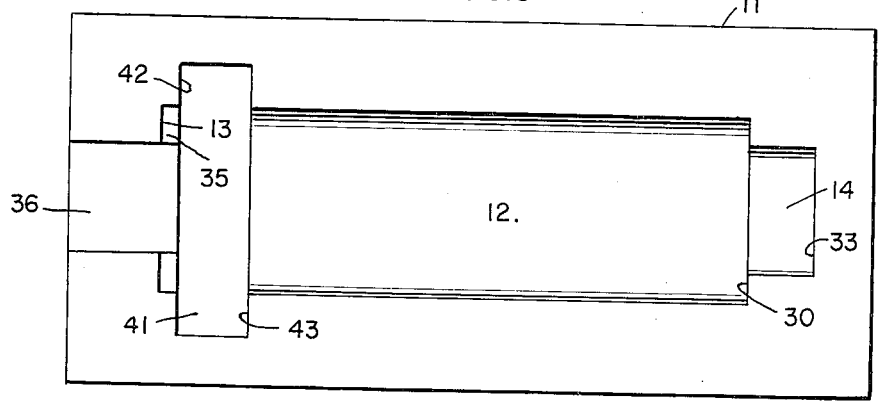
FIG. 5 is a plan view of the lower mold section illustrating further the details of construction thereof.
Figure 6:
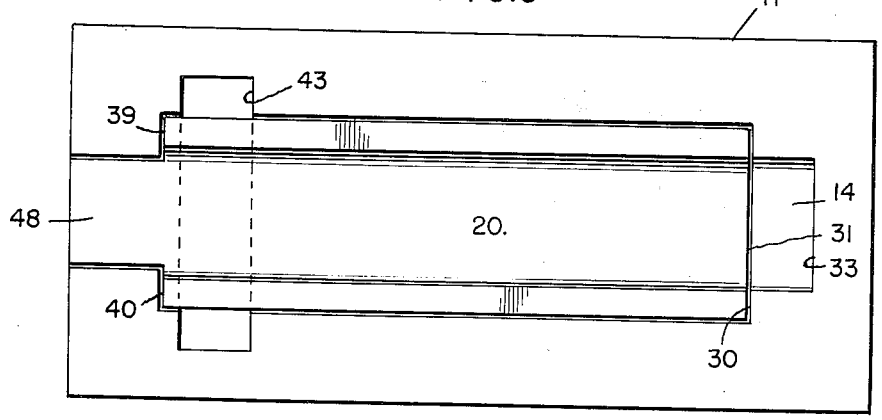
FIG. 6 is a plan view similar to FIG. 5 but showing one of the core setters operatively positioned within the lower mold section.
Figure 7:
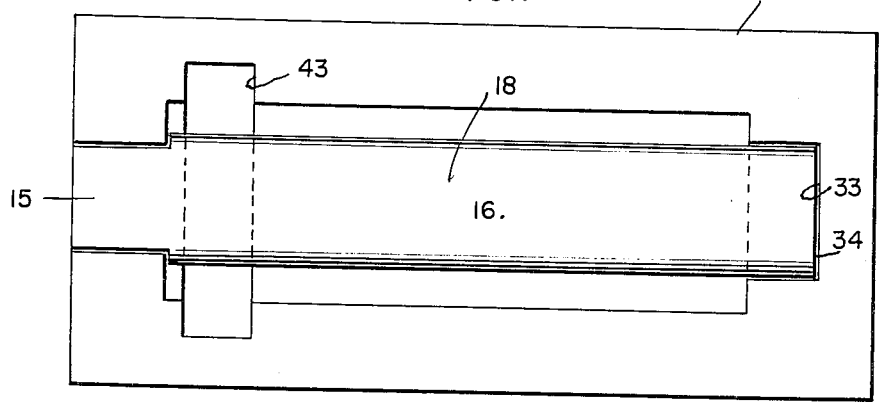
FIG. 7 is a view similar to FIG. 6 but showing the core proper positioned within the lower mold section prior to the completed assembly of the mold.

Referring at this time more particularly to the drawings, reference numerals 10 and 11 indicate a pair of separable mold members which may be of any convenient exterior form and their opposed faces forming a mold cavity 12 therebetween. In addition to the mold cavity 12 formed therebetween, the mold members 10 and 11 are provided with core prints 13 and 14, which are adapted to receive and sandwich therebetween opposite end portions 15 and 16 of core member 17, leaving the main body or central portion 18 of the core supported in spaced relationship within the cavity 12, see FIG. 3.

Reference characters 19 and 20 designate a pair of pattern members or core setters which are shaped on the outer surface 21 in conformity with the mold cavity so as to substantially completely fill the same and with their inner surfaces formed in conformity with the exterior surface of the main body portion 18 of the core 17 such that when the parts are all assembled, as is illustrated in FIG. 2, the entire assemblage is of substantially solid nature, obviating any voids or gaps between the component parts thereof for a purpose which will be presently apparent.

The several parts 10, 11, 17, 19, and 20 are all preferably formed of ceramic material such as, for example, oxides of beryllium, aluminum, silicon, magnesium, calcium, barium, titanium, zirconium, rare earths, or mixtures of any of these. Similarly, pure elements such as calcium and silicon may be used.

The ceramic parts themselves are preferably formed by molding the same within permanent molds so as to assure the uniformity and accuracy thereof. These ceramic materials after having been assembled in the manner illustrated in FIG. 2, are placed in a suitable furnace, oven or the like for curing or firing to attain the requisite rigidity and hardness thereof preparatory to the actual casting operation.

Assembling the mold mechanism as a unit as illustrated in FIG. 2 for firing or curing it in this manner, any distortion which might tend to occur can be minimized as between the individual parts thereof relative to each other and even if the entire assemblage itself is subjected to distortion or warpage, it will be constrained to be substantially symmetrical such that relatively simple machining operations can be utilized in correcting the distortion. In contrast to this, with prior art practice, asymmetrical distortion or warpage is common and in order to correct it, relatively complex machining operations are necessitated, these being an appreciable economic consideration.

FIGS. 3 and 4 illustrate the method of using the assemblage for casting purposes. It will be seen from these figures that after curing of the ceramic parts the core setters or patterns 20 and 21 are removed and discarded and then the mold is re-assembled with the core 17 in place and held within the mold cavity in proper position in respect thereto by virtue of the sandwiching of the end portions 15 and 16 thereof between the mold halves 10 and 11, see particularly FIG. 4.

It is to be understood that a suitable gate is to be provided at the desired point in the mold halves 10 and 11 so that the molten metal can be subsequently introduced into the mold cavity. After the casting operation, the mold halves are separated and the cast part removed whereafter the core may be etched away from the metal casting.

It will be noted that the two mold sections 10 and 11 are provided with the stepped portions 30 which are adapted to receive the end edge portions 31 and 32 of the core setter pieces 19 and 20 for supporting the corresponding ends of the same and positioning them properly within the mold cavity. That is to say, the end edges 31 and 32 of the core setters are abutted against the stepped portions 30 of the mold sections 10 and 11 and therefore properly position the core setters 19 and 20 with respect thereto.

Likewise, the core prints 14 present stepped portions 33 which are adapted to provide abutments for the end edge 34 of the core 17 so as to hold this component part properly in position within the mold assembly.

At the gate end of the mold assembly, platforms 35 are presented on opposite sides of the gate troughs 36 and between the main body portion 37 of the mold assembly and the gate end portion 36 thereof so as to support and engage the shoulders 39 and 40 of the core setters and lend support to these ends of the core setters. An open rectangular depression 41 is formed just inwardly of these platforms 35 and, as can be seen, this depression or recess is of a width greater than the width of the core setters so as to present wing portions 42 and 43 which extend laterally beyond the opposite sides of the main depression 12 in the mold assemblies.

The gate troughs 36 are of a depth greater than the depth of the platforms 35 so as to present passageways 45 and 46, see particularly FIG. 4, when the parts are in the assembled position and which passageways extend into and communicate with the depressions 41. Thus, when the mold is ready for casting operations and the core 17 only is placed between the mold sections 10 and 11, there will be an appreciable gate around the tongue end 15 of the core permitting the molten metal to be poured into the mold cavity. The depressions 41 form the base for the article made by the mold specifically shown which is, in this particular case, a turbine blade of hollow construction.

The core setters 20 and 21 are provided with tongue portions 47 and 48 corresponding to the tongue or end portion 15 of the core and coextensive in length therewith, and which tongues 47 and 48 sandwich the portion 15 therebetween as is clearly shown in FIG. 4.

Essentially then, it will be seen that this invention concerns casting and by means of a novel assembly wherein the mold portions and the core are maintained in proper relationship with respect to each other during the curing process so as to minimize distortion and wherein the patterns or core setters which are used are subsequently discarded to provide the mold cavity itself permitting of a uniformity and accuracy of casting with a minimum expenditure of time and effort than has heretofore been possible.

I claim:

1. The method of casting hollow, thin section metallic parts free of material distortion, which comprises the steps of forming and assembling a plurality of separate and complemental uncured ceramic parts to form a substantially solid mass of uncured ceramic material, heat curing said ceramic parts simultaneously and while assembled in such solid mass, removing certain of said cured ceramic parts and then re-assembling the remaining parts in their original order to present a cored mold cavity therewithin, then introducing metal to be cast into such mold cavity.

2. The method of casting hollow, thin section metallic parts free of material distortion, which comprises the steps of separately forming a pair of mold sections, a pair of patterns and a core, all of complemental form and of uncured ceramic material, assembling such parts to form a mass of substantially solid uncured ceramic material, heat curing such mass as assembled and as a unit, disassembling the cured parts and then re-assembling only the mold sections and the core to provide a mold cavity between said mold sections, and then introducing metal to be cast into such cavity.

3. The method of casting hollow, thin section metallic parts free of material distortion, which comprises separately forming and assembling a plurality of separate and complemental ceramic parts having substantially uniform surface contact throughout so as to present a substantially solid mass of uncured ceramic material, heat curing said parts while thus assembled whereby the individual parts are supported throughout the mass during curing to minimize warping or distortion thereof, disassembling said parts and discarding certain of the inner ones and then re-assembling the parts in their original relationship so as to provide a cored mold cavity therewith in and then introducing metal to be cast into such cavity.

4. The method of casting hollow, thin section metallic parts free of material distortion, which comprises forming a split hollow shell of uncured ceramics and a plurality of separate parts of uncured ceramics having complemental shapes to interfit with one another and form a substantially solid mass having an external shape to substantially completely fill the hollow within such shell, assembling said parts and placing the same within the portions of said shell to provide a substantially solid mass of uncured ceramics having said shell forming the outer confines thereof, heat curing the shell and parts simultaneously and as an assembled unit, disassembling the unit and discarding certain of said parts and then re-assembling the remaining parts and said shell therearound so as to leave a cored mold cavity within the shell, and then introducing metal to be cast into said cavity.

5. The method of casting hollow, thin section metallic parts free of material distortion, which comprises forming a split hollow shell of uncured ceramics and a plurality of separate parts of uncured ceramics having complemental shapes to interfit with one another and form a substantially solid mass having an external shape to substantially completely fill the hollow within such shell, assembling said parts and placing the same within the portions of said shell to provide a substantially solid mass of uncured ceramics having said shell forming the outer confines thereof, heat curing the shell and parts simultaneously and as an assembled unit, disassembling the unit and discarding the outer of said parts and then re-assembling the remaining parts and said shell therearound so as to leave a cored mold cavity within the shell, and then introducing metal to be cast into said cavity.

6. The method of making a mold assembly for hollow, thin section metallic castings, which consists of a pair of outer mold sections presenting a cavity therein and a core element supported by said sections within the cavity, which method comprises the steps of forming said mold sections and said core of uncured ceramic material, assembling said mold sections and said core with dense, rigid filler material within said cavity around said core so as to present a substantially solid mass, heat curing said mold sections, said filler material and said core while in such solid mass form, disassembling the individual parts and then re-assembling only the mold sections and the core.

7. A mold assembly for casting articles having thin sections, said assembly comprising a pair of outer mold sections disposed in face to face relation and presenting a mold cavity therebetween, a core piece sandwiched between said mold sections and positioned to extend within said mold cavity, and a pair of separable core sections surrounding said core and substantially filling the remaining mold cavity therearound, said mold sections, said core and said core sections being made of ceramic material and adapted to be cured as an assembled mass to minimize distortion thereof.

8. The method of making a substantially distortion-free mold for thin section castings, wherein the mold comprises a pair of outer mold components, a central core component and a pair of core pattern components, which method comprises the steps of separately making the component parts of the mold assembly of uncured, ceramic material, assembling such component parts and subsequently heat curing the same while assembled, and then using mating outer mold and central core cured component parts as a unit for casting.

References Cited in the file of this patent

UNITED STATES PATENTS

| | | |
|---|---|---|
| 1,034,334 | Bannister | July 30, 1912 |
| 1,344,737 | Stoney | June 29, 1920 |
| 1,678,655 | Sipp | July 31, 1928 |
| 1,864,451 | Lungen | June 21, 1932 |
| 2,173,955 | Zahn | Sept. 26, 1939 |
| 2,373,405 | Lowit | Apr. 10, 1945 |
| 2,754,570 | Crawford | July 17, 1956 |
| 2,782,477 | Bean et al. | Feb. 26, 1957 |

OTHER REFERENCES

Modern Foundry Practice, Odhams Press, Ltd., London, pages 155, 156. Received in Patent Office 1945.